A. H. NEULAND.
ELECTROMAGNETIC TRANSMISSION.
APPLICATION FILED MAY 27, 1918.

1,410,215.

Patented Mar. 21, 1922.
2 SHEETS—SHEET 1.

INVENTOR
Alfons N. Neuland
BY
Rosenbaum, Stockbridge & Borst
ATTORNEYS

A. H. NEULAND.
ELECTROMAGNETIC TRANSMISSION.
APPLICATION FILED MAY 27, 1918.
1,410,215.
Patented Mar. 21, 1922.
2 SHEETS—SHEET 2.
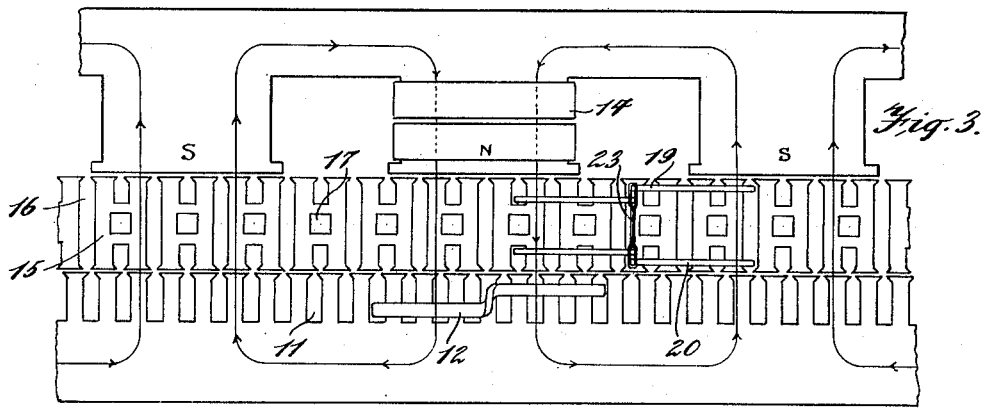
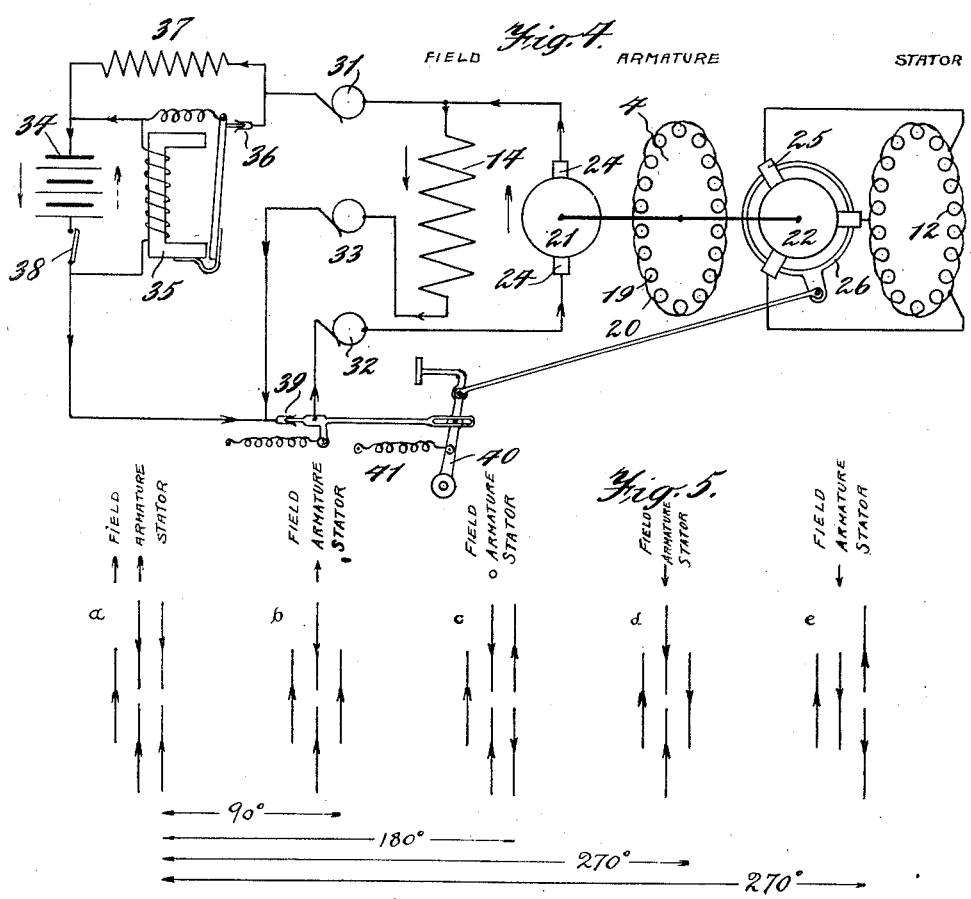
INVENTOR
Alfons N. Neuland
BY
Rosenbaum, Stockbridge & Borst
ATTORNEYS

UNITED STATES PATENT OFFICE.

ALFONS H. NEULAND, OF BERGENFIELD, NEW JERSEY.

ELECTROMAGNETIC TRANSMISSION.

1,410,215.  Specification of Letters Patent.  Patented Mar. 21, 1922.

Application filed May 27, 1918. Serial No. 236,679.

*To all whom it may concern:*

Be it known that I, ALFONS H. NEULAND, a citizen of the Provisional Government of Russia, residing at Bergenfield, in the county of Bergen and State of New Jersey, have invented certain new and useful Improvements in Electromagnetic Transmission, of which the following is a full, clear, and exact description.

My invention relates to electro-magnetic power transmission devices, being especially adaptable as an automobile transmission.

Devices of this character which have heretofore been applied to use in automobiles have been heavy as compared with mechanical speed change gearing, and have had the further disadvantage that, due to the greater mass of the primary and secondary rotating elements in the electrical transmission, the acceleration and braking are less rapid and easy.

One object of my invention is the production of a transmission of this character which will be of relatively light weight. Another object is to provide for dynamic braking at practically all speeds. Another object is to provide such a construction in which the speed of the secondary may be made to exceed that of the primary, and in which a secondary torque may be produced exceeding that of the primary, and in which the direction of the secondary may be reversed. Other objects are facility and simplicity of control, convenience in assembly, rigidity of construction, and reliability of operation. Still other objects and advantages of my invention will appear from the following description.

In accordance with my invention, I employ direct and alternating currents in a device of unitary construction comprising three elements in inductive relation to each other and traversed by a common magnetic flux.

My invention comprehends a rotative primary field, a secondary rotative armature with two commutators, and preferably a three-phase stator; all in inductive relation to each other and so arranged that the armature is intermediate of the field and the stator. Stationary three-phase brushes wipe one commutator and are connected to the stator winding while the other commutator contacts with brushes fastened to the field and connected to the field winding. In the preferred construction, the armature is of a special disk type and the other elements are arranged to conform. The direct current produces a torque on one side of the armature and is further used to make the device self-exciting, to charge the battery and to start the engine, while the alternating current produces a torque on the other side of the armature and is also employed to control the speed, torque, direction of rotation and braking by shifting the polyphase brushes.

The armature is so constructed that by means of circumferentially spaced sections the bulk of the field flux is made to traverse it axially, reach the stator and also link the winding thereon. Rotation of the field will, therefore, generate a current in the armature, as well as in the stator windings. Since the armature and stator windings form a series circuit the current flowing therethrough will, in each winding, set up a magnetomotive force which may be in phase or out of phase with each other, depending on the position of the polyphase brushes, so that the shifting of these brushes will accelerate, decelerate or change the direction of rotation of the armature.

My invention also comprehends various features of mechanical construction, details and arrangements of parts, as will hereinafter more fully appear.

I shall now describe the illustrated embodiment of my invention and shall thereafter point out my invention in claims.

Fig. 3 is a development of a portion of the periphery, showing in detail the shape of the armature sections, stator laminations, and field element.

Fig. 4 is a diagram of the electric circuits.

Figure 1:
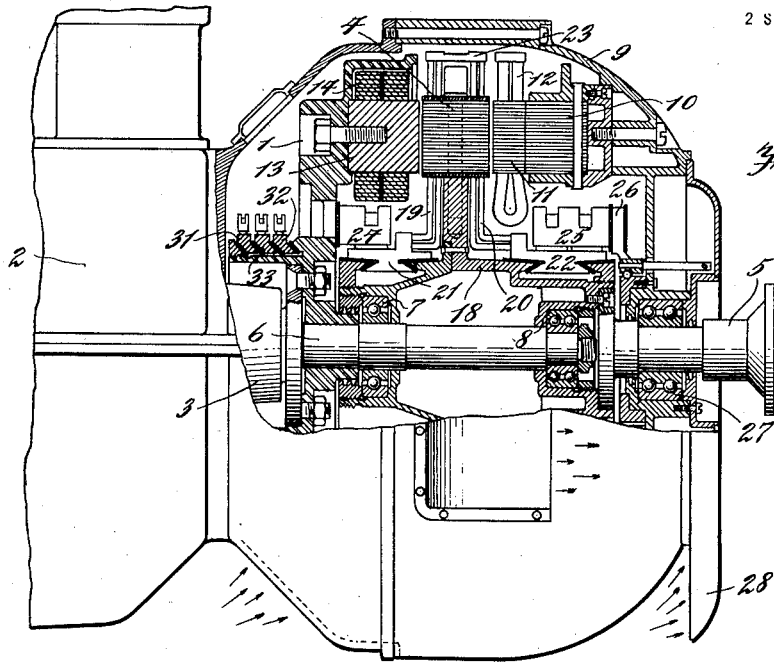
Fig. 1 is a partial longitudinal section and a partial side elevation of a complete transmission embodying my invention.
Figure 2:
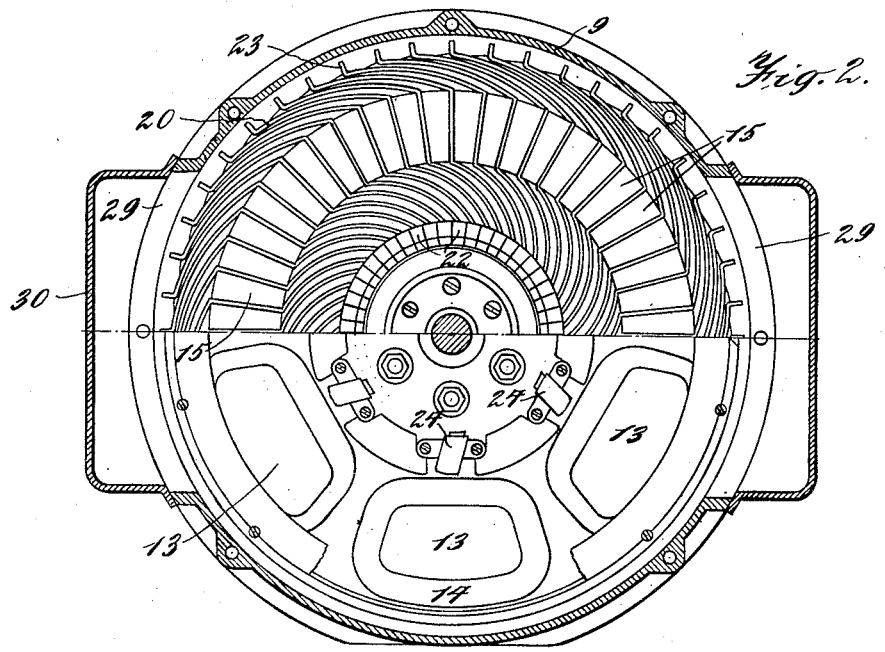
Fig. 2 is a transverse section, the upper part exposing the armature and the lower half showing the field with the armature removed.

In Fig. 5, $a$, $b$, $c$, $d$, $e$, are diagrams showing the direction of the currents in the windings which produce the relative magnetomotive forces in the windings with the brushes in the several positions.

The transmission as illustrated in the drawings is particularly adapted to automobiles, in that the driving or primary field 1 serves as the fly-wheel for the internal combustion engine 2, and is rigidly connected to the crank-shaft 3. The secondary or driven armature 4 is connected to the propeller shaft 5 and is carried on an extension of the crank shaft, shown as a separate stub shaft 6, by means of the ball bearings 7 and 8. Secured to the housing 9 is the stator element 10, consisting of a laminated ring provided on its inner side with slots 11, in which is lodged the distributed winding 12.

There are six pole-pieces numbered 13 on the field, each carrying a field coil 14. The field, armature and stator are each in inductive relation to the others, it being of particular importance to note that the field is in inductive relation to the stator, even though they are separated by the armature. This is due to the special construction of the armature, which is built up of laminated sectors 15, separated from each other by the spaces 16, which prevent the flux from traversing the armature circumferentially. The sectors are shaped in the form of the letter H, having a hole in the middle fitting over the metal rods 17; the rods, in turn, are solidly pressed into holes of the armature spider 18, preferably broached square, to prevent twisting.

By this means a double-faced armature is secured, each side having slots twice the number of sections. The faces are provided with windings 19 and 20, respectively, connecting to commutators 21 and 22, respectively. The windings are interconnected by a plurality of conductors 23, which serve to divide the current equally between the two windings and which permit, at certain times, the conversion of the A. C. current generated in the stator to direct current and its transfer and use in charging the battery and energizing the field.

Direct current brushes 24, attached to and rotating with the field, wipe the commutator 21, but the commutator 22 is wiped by stationary brushes 25, spaced 120 electrical degrees apart and made to commutate three-phase currents. These brushes are held by a rocker 26, and can be shifted over an arc of about 270 electrical degrees.

As above mentioned, the armature is carried by the stub shaft 6 extending from the field member, and the armature is spaced from and aligned with the field member by the radial and thrust bearing 8. The weight of both the armature and field member is therefore carried by the crank-shaft, so that only the weight of the stator element is carried by the casing which, for this reason, can dispense with heavy supporting means. A ball bearing 27 helps support the propeller shaft 5, and insures rigidity.

Particular provision is made for forcibly and effectively ventilating the transmission. For this purpose the downwardly extending scoop-shaped cover 28, and the lower part of the engine housing are provided with openings in the direction of travel of the vehicle. The connectors 23, at the outer circumference of the armature, further serve as powerful vanes or fan blades and operate to expel the air through circumferential openings 29 into side covers 30, which change the course of the air to the direction of travel of the vehicle.

The electrical connections of the transmission system are diagrammatically illustrated in Fig. 4, where the three-phase brushes 25 are shown connected to the stator winding. On the other side of the armature 4 the brushes 24 connect, one to the slip-ring 31 and to the field winding 14, while the other brush connects to slip-ring 32. The remaining field lead is connected to slip-ring 33. A portion of the armature current on the D. C. side is fed to the field 14, and another portion to the battery 34, which is shunted across the field, enabling the battery to supply a portion of the field current when the potential at the D. C. brushes is insufficient. When the load is heavy and the potential and charging current become excessive magnet 35, controlled by the battery potential, opens a switch 36 in the battery circuit, and thereby inserts a resistance 37, which is arranged in parallel to the switch 36, into the battery circuit and so reduces the charging current. The device is made to crank the engine by closing a switch 38, whereupon current is conducted from the battery to the armature and field in multiple relation. As soon as the engine starts a sufficient potential is at once generated to prevent further flow of current from the battery.

Fig. 5 illustrates the relations between the magnetomotive forces in the windings, the arrows indicating the direction of the current in the three members in various positions of the three phase brushes.

$a$ shows the condition when the armature and stator currents are in phase. Assuming the field driven at constant speed and the effective turns on the two elements to be the same, a voltage twice that in one winding will be induced while the armature is at rest, since the two windings are connected in series. Consequently, when the armature speeds up and rotates at the speed of the field no potential is generated in the armature, but the potential in the stator has not diminished and will force the flow of current to continue and cause the armature to rotate faster than the field and to generate a counter potential. The armature speed will continue to increase until the rising counter potential nearly equals the constant potential of the stator. This occurs when the negative slip between the field and armature equals the relative velocity between field and stator; that is, when the armature speed is twice that of the field. It should be noted that the armature speed is dependent upon the balancing of two potentials, one varying and one constant. It is also of importance to note that in the above case the armature receives energy from two sources; a mechanical component in the form of a torque from the field (even though the armature speed is greater), and an electrical component from the stator, acting at this time as a generating element, overcoming the counter potential of the armature and adding to its speed. Furthermore, a portion of the A. C. stator current is converted by the armature into direct current and through the D. C. brushes is fed to the field and battery.

*b* shows the current relations with the brushes shifted 90 electrical degrees. The stator current is now in phase with the field current, resulting in a greatly strengthened field, an increased torque and decreased speed. It will be observed that the armature is acted on by the field on one side, while the stator exerts another torque on the other side.

In *c* the shift has been increased to 180° with the result that the stator current is now in phase with, but opposed to the armature current, so that no torque is present, due to the A. C. circuit. A slight further shifting will even overcome and neutralize the torque due to the field.

With brushes shifted 270°, as in *d*, the A. C. relation between stator and armature is such that the latter will rotate in reverse direction.

*e* shows the relations when the switch 39 is opened and the field fed by the battery. There is now very little forward torque between the field and armature, since the armature current is greatly lagging, so that practically the full reverse torque exerted by the stator winding is available.

The entire control is in this way obtained by simply shifting the brushes progressively. This is preferably done by a pedal lever 40, shown in Fig. 4, which, when depressed all the way for reverse, will open the switch 39, for maximum reverse torque. When released, the pedal will, due to the retractile means 41, return to the normal operating position shown in *a*, in which the vehicle operates at high speed relative to the engine speed, corresponding to the greatest economy. The same pedal, when properly depressed, will brake and decelerate the vehicle with varying degree.

From the foregoing it is seen that the stator element performs various functions; it is a generating element at times, and at others acts in the capacity of a motor element; the armature fulfilling the requirements of a double current generator, converter, clutch member and motor element.

It is obvious that various modifications may be made in the construction shown in the drawings and above particularly described within the principle and scope of my invention.

I claim:

1. An electro-magnetic power transmission device comprising a stator including a winding, a rotative armature immediately opposing the stator and including a winding inductively related to the stator winding and electrically connected therewith, and a rotative field member inductively related to the armature and to the stator.

2. An electro-magnetic power transmission device comprising a stator including a winding, a rotative armature immediately opposing the stator and including a winding inductively related to the stator winding, means conductively connecting the two windings including a commutator and stationary brushes, and a rotative field member inductively related to the armature and to the stator.

3. An electro-magnetic power transmission device comprising a stator including a winding, a rotative armature including a commutator and a winding inductively related to the stator winding, stationary brushes wiping the commutator and connected to the stator winding, and a rotative field member inductively related to the armature and to the stator.

4. An electro-magnetic power transmission device comprising a stator including a polyphase winding, a rotative armature including a commutator and a winding inductively related to the stator winding, stationary polyphase spaced brushes wiping the commutator and connected to the stator winding, and a rotative field member inductively related to the armature and to the stator.

5. An electroc-magnetic power transmission device comprising a stator including a winding, a rotative armature including two commutators and a winding inductively related to the stator winding and connected to the two commutators, stationary brushes wiping one commutator and connected to the stator winding, a rotative field member inductively related to the armature and stator, and brushes wiping the other commutator and connected to the magnet windings of the field member.

6. An electro-magnetic power transmission device comprising a double-faced rotative armature including two commutators and a winding on each face, the two windings being interconnected and connected respectively to the two commutators, a stator opposing one face of the armature and including a winding inductively related to the armature winding and electrically connected therewith by means including stationary brushes wiping one commutator and a rotative field member opposing the other face of the armature with its magnet windings connected to the armature winding by means of brushes rotative with the field member and wiping the other commutator, the field flux traversing both the armature and stator.

7. In an electro-magnetic power transmission device, a double-faced rotative armature including two commutators and a winding on each face, the two windings being interconnected and connected respectively to the two commutators, a secondary element opposing one face of the armature and having electrical connection with one commutator, and a primary element opposing the other face of the armature and having electrical connection with the other commutator.

8. In an electro-magnetic power transmission device, a double-faced disc armature comprising a plurality of radial lamination-supporting bars, a laminated section on each bar provided on each side with an intermediate coil-receiving slot and the successive sections being spaced apart to minimize passage of flux between sections and to provide a coil-receiving slot between them, forming an annular laminated core having on each side twice as many slots as sections, a commutator on each side of the armature core, a winding on each side of the armature core arranged in the slots with its spread circumferential of the armature and connected to the respective commutator, and a plurality of conductors connecting the two windings.

9. In an electro-magnetic power transmission device, a double-faced disc armature comprising a plurality of radial lamination-supporting bars, a laminated section on each bar provided on each side with an intermediate coil-receiving slot and the successive sections being spaced apart to minimize passage of flux between sections and to provide a coil-receiving slot between them, forming an annular laminated core having on each side twice as many slots as sections, a commutator on each side of the armature core, a winding on each side of the armature core arranged in the slots with its spread circumferential of the armature and connected to the respective commutator, and a plurality of conductors connecting the two windings; a secondary element opposing one face of the armature and having electrical connection with one commutator, and a primary element opposing the other face of the armature and having electrical connection with the other commutator.

10. In an electro-magnetic power transmission device, a double-faced disc armature comprising a plurality of radial lamination-supporting bars, a laminated section on each bar provided on each side with an intermediate coil-receiving slot and the successive sections being spaced apart to minimize passage of flux between sections and to provide a coil-receiving slot between them, forming an annular laminated core having on each side twice as many slots as sections, a commutator on each side of the armature core, a winding on each side of the armature core arranged in the slots with its spread circumferential of the armature and connected to the respective commutator, and a plurality of conductors connecting the two windings; an annular stator element opposing one face of the armature and having a distributed winding arranged on its opposing face in inductive relation with the armature winding, stationary brushes wiping the adjacent commutator and connected with the stator winding, a rotative annular field member arranged coaxially with the armature and stator and opposing the other face of the armature, whereby the field flux traverses both the armature and stator, and brushes rotative with the field and connected to the magnet windings and wiping the adjacent commutator.

11. An electro-magnetic power transmission device comprising a stator including a winding, a rotative armature immediately opposing the stator and including a winding inductively related to the stator winding, means including a commutator and stationary brushes conductively connecting the two windings, means for angularly shifting the brushes on the commutator, and a rotative field member inductively related to the armature and to the stator.

12. An electro-magnetic power transmission device comprising a secondary disc armature including a commutator and having its winding arranged upon the armature face with its spread circumferential of the armature, an annular stator member opposing one face and including a winding arranged in inductive relation to the armature winding, stationary brushes wiping the commutator and connected with the stator winding, means for angularly shifting the brushes on the commutator, and a source of rotative flux cutting both windings.

13. An electro-magnetic power transmission device comprising a secondary disc armature including two commutators disposed on opposite sides of the armature and a winding arranged partially on one face and partially on the other face of the armature with its spread circumferential of the armature and having connection with both commutators, an annular stator member opposing one face and including a distributed winding arranged in inductive relation to the armature winding, stationary brushes wiping the adjacent commutator and connected with the stator winding, means for angularly shifting the brushes on the commutator, a primary rotative annular field member arranged coaxially with the armature and stator and opposing the other face of the armature whereby the field flux traverses both the armature and stator, and brushes rotative with the field and connected with the magnet windings and wiping the adjacent commutator.

14. In a motor vehicle, in combination with the prime mover and propeller shaft, a secondary armature fixed to the propeller shaft and including a commutator, a stator including a winding inductively related to the armature winding, stationary brushes wiping the commutator and connected with the stator winding and arranged to be angularly shifted on the commutator, a manually operated rocker for shifting the brushes, and a primary field member rotatable by the prime mover and arranged in inductive relation to the armature and stator windings.

15. In a motor vehicle, in combination with the prime mover and propeller shaft, a secondary double-faced armature including two commutators and having its winding connected to both commutators, a stator member opposing one face of the armature and including a winding in inductive relation to the armature winding, stationary brushes wiping one commutator and connected with the stator winding and arranged to be angularly shifted on the commutator, a manually operated rocker for shifting the brushes, a primary field member rotatable by the prime mover and arranged in inductive relation to the armature and stator windings, and brushes rotative with the field member and connected with the magnet windings and wiping the other commutator.

16. A dynamo-electric machine comprising a stator including a winding, a rotative armature including a winding immediately opposing the stator, a rotative field member including a winding immediately opposing the rotative armature and inductively related to both armature and stator windings, and means for electrically connecting the three windings.

17. A dynamo-electric machine comprising a stator including a winding, a rotative armature immediately opposing the stator and including a plurality of spaced magnetic conductors, a rotative field member including a winding immediately opposing the rotative armature, and means for electrically connecting the three windings.

In witness whereof, I subscribe my signature.

ALFONS H. NEULAND.